(12) United States Patent
Johnson et al.

(10) Patent No.: US 10,960,985 B2
(45) Date of Patent: Mar. 30, 2021

(54) INTEGRATING AN APPLICATION RUNNING ON A PORTABLE ELECTRONIC DEVICE INTO A FLIGHT DECK DISPLAY OF AN AIRCRAFT

(71) Applicant: THE BOEING COMPANY, Chicago, IL (US)

(72) Inventors: Keith L. Johnson, Seattle, WA (US); Peter J. Batsakes, Seattle, WA (US); Brandon S. Uttech, Burien, WA (US)

(73) Assignee: The Boeing Company, Chicago, IL (US)

( * ) Notice: Subject to any disclaimer, the term of this patent is extended or adjusted under 35 U.S.C. 154(b) by 79 days.

(21) Appl. No.: 16/176,635

(22) Filed: Oct. 31, 2018

(65) Prior Publication Data

US 2020/0130860 A1 Apr. 30, 2020

(51) Int. Cl.
*B64D 43/00* (2006.01)
*G06F 21/44* (2013.01)
*G06F 3/0488* (2013.01)
*G06F 3/14* (2006.01)

(52) U.S. Cl.
CPC .......... *B64D 43/00* (2013.01); *G06F 3/0488* (2013.01); *G06F 3/1454* (2013.01); *G06F 21/44* (2013.01)

(58) Field of Classification Search
CPC ....... B64D 43/00; G06F 3/1454; G06F 21/44; G06F 3/0488
See application file for complete search history.

(56) References Cited

U.S. PATENT DOCUMENTS

| 9,980,298 | B2 | 5/2018 | Batsakes et al. | |
|---|---|---|---|---|
| 2010/0094595 | A1* | 4/2010 | Whittington | G09B 9/301 703/1 |
| 2010/0152924 | A1* | 6/2010 | Pandit | G01C 23/00 701/3 |
| 2014/0188311 | A1* | 7/2014 | Masson | B64D 43/00 701/3 |
| 2014/0222254 | A1* | 8/2014 | Ribich | G06F 8/00 701/3 |
| 2016/0349933 | A1* | 12/2016 | Owczarski | H04L 63/123 |
| 2017/0241798 | A1* | 8/2017 | Van Den Bergh | G01C 23/00 |

* cited by examiner

*Primary Examiner* — Peter D Nolan
*Assistant Examiner* — Ashley L Redhead, Jr.
(74) *Attorney, Agent, or Firm* — Sage Patent Group

(57) ABSTRACT

A method for integrating an application into a flight deck includes receiving, by the flight deck, an identification of the application for integrating into the flight deck, wherein the application is running on a portable electronic device (PED) separate from the flight deck. The method also includes transmitting, by the flight deck, the identification of the application to the PED. The method additionally includes locating an application window corresponding to the application on a display of the PED and reading pixel data corresponding to the application window on the display of the PED. The method further includes transmitting the pixel data from the PED to the flight deck and integrating the application into the flight deck using the pixel data.

20 Claims, 5 Drawing Sheets

INTEGRATING AN APPLICATION RUNNING ON A PORTABLE ELECTRONIC DEVICE INTO A FLIGHT DECK DISPLAY OF AN AIRCRAFT

FIELD

The present disclosure relates to aircraft or aerospace vehicles and more particularly to integrating an application running on a portable electronic device (PED) into a flight deck display of an aircraft.

BACKGROUND

Information used by flight crews in performing their overall mission, such as for example manuals, flight plans, charting information, performance tables, etc. were once provided in paper form but more recently are being provided in electronic form in what is known as an electronic flight bag (EFB) embodied on a portable electronic device (PED). This portable electronic format is much easier to maintain and update and eliminates the weight and inconvenience associated with the previous paper format. In order to be used during all phases of flight, however, these PED-based EFB systems must be securely mounted in the flight deck. Unfortunately, in some flight decks, there is not sufficient space or a suitable location to mount a PED for easy viewing and interaction. In addition, it is sometimes difficult to position a tablet computer for shared viewing or convenient viewing alongside flight deck multifunction displays resulting in more difficult crew coordination reducing the overall usability of the PED-based EFB information.

SUMMARY

In accordance with an embodiment, a method for integrating an application into a flight deck includes receiving, by the flight deck, an identification of the application for integrating into the flight deck, wherein the application is running on a portable electronic (PED) separate from the flight deck. The method also includes transmitting, by the flight deck, the identification of the application to the PED and locating an application window corresponding to the application on a display of the PED. The method additionally includes reading pixel data corresponding to the application window on the display of the PED and transmitting the pixel data from the PED to the flight deck. The method further includes integrating the application into the flight deck using the pixel data.

In accordance with another embodiment, a system for integrating an application into a flight deck includes the flight deck and the flight deck includes a crew interface gateway. The crew interface gate is configured to receive an identification of the application for integrating into the flight deck, wherein the application is running on a portable electronic device (PED) separate from the flight deck. The crew interface gateway is further configured to transmit the identification of the application to the PED. The system also includes an onscreen application capture utility operable on the PED. The onscreen application capture utility is configured to locate an application window corresponding to the application on a display of the PED, to read pixel data corresponding to the application window on the display of the PED, and to transmit the pixel data from the PED to the flight deck. The crew interface gateway is further configured to integrate the application into the flight deck using the pixel data.

In accordance with an embodiment and any of the previous embodiments, the onscreen application capture utility is further configured to locate the application window corresponding to the application on the display of the PED by matching the identification of the application to an identification specified in the onscreen application capture utility.

In accordance with an embodiment and any of the previous embodiments, the system further includes a predefined list of approved applications, wherein the onscreen application capture utility is further configured to match the identification of the application for integrating into the flight deck to an identification of an approved application in the predefined list of approved applications for integrating into the flight deck.

In accordance with an embodiment and any of the previous embodiments, the onscreen application capture utility is further configured to read the pixel data limited to an area on the display of the PED occupied by the application window.

In accordance with an embodiment and any of the previous embodiments, the crew interface gateway is further configured to receive inputs entered by a user into an application window running on a flight deck display and to transmit the inputs to the PED for performance of a function by the application on the PED in response to the inputs.

In accordance with an embodiment and any of the previous embodiments, the method or system also includes presenting the application window on the display of the PED in response to running the application on the PED.

In accordance with an embodiment and any of the previous embodiments, wherein receiving the identification of the application includes receiving touchscreen inputs by a user on a flight deck display.

In accordance with an embodiment and any of the previous embodiments, wherein locating the application window corresponding to the application on the display of the PED includes matching the identification of the application to an identification specified in an onscreen application capture utility.

In accordance with an embodiment and any of the previous embodiments, wherein locating the application window corresponding to the application on the display of the PED includes matching the identification of the application to an identification of an approved application in a predefined list of approved applications for integrating into the flight deck.

In accordance with an embodiment and any of the previous embodiments, the method or system further includes presenting a message on a flight deck display that the application is not approved for integrating into the flight deck in response to not being able to match the identification of the application to the identification of one of the approved applications in the predefined list of approved applications.

In accordance with an embodiment and any of the previous embodiments, wherein reading the pixel data corresponding to the application window on the display of the PED includes reading red, green and blue pixel values from a screen buffer of the PED.

In accordance with an embodiment and any of the previous embodiments, wherein reading the pixel data includes limiting the pixel data to pixel data in an area on the display of the PED occupied by the application window.

In accordance with an embodiment and any of the previous embodiments, the method or system further includes filtering the pixel data to include only pixel data in the application window for integrating into the flight deck.

In accordance with an embodiment and any of the previous embodiments, the method or system further includes formatting the pixel data for transmitting to the flight deck.

In accordance with an embodiment and any of the previous embodiments, the method or system further includes receiving the pixel data from the PED by a crew interface gateway in the flight deck.

In accordance with an embodiment and any of the previous embodiments, the method or system further includes transforming coordinates of the pixel data to fit presentation of the application on a flight deck display.

In accordance with an embodiment and any of the previous embodiments, the method or system further includes receiving inputs from a user by an application window running on a flight deck display.

In accordance with an embodiment and any of the previous embodiments, wherein receiving inputs from the user by the application window includes receiving touchscreen inputs by the flight deck display.

In accordance with an embodiment and any of the previous embodiments, the method or system further includes transmitting the inputs to the PED by a crew interface gateway of the flight deck and transforming coordinates of the inputs from the flight deck to match coordinates of the application window on the display of the PED. The method or system additionally includes performing functions by the application on the PED using the transformed coordinates of the inputs.

The features, functions, and advantages that have been discussed can be achieved independently in various embodiments or may be combined in yet other embodiments further details of which can be seen with reference to the following description and drawings.

DETAILED DESCRIPTION

Figure 1:
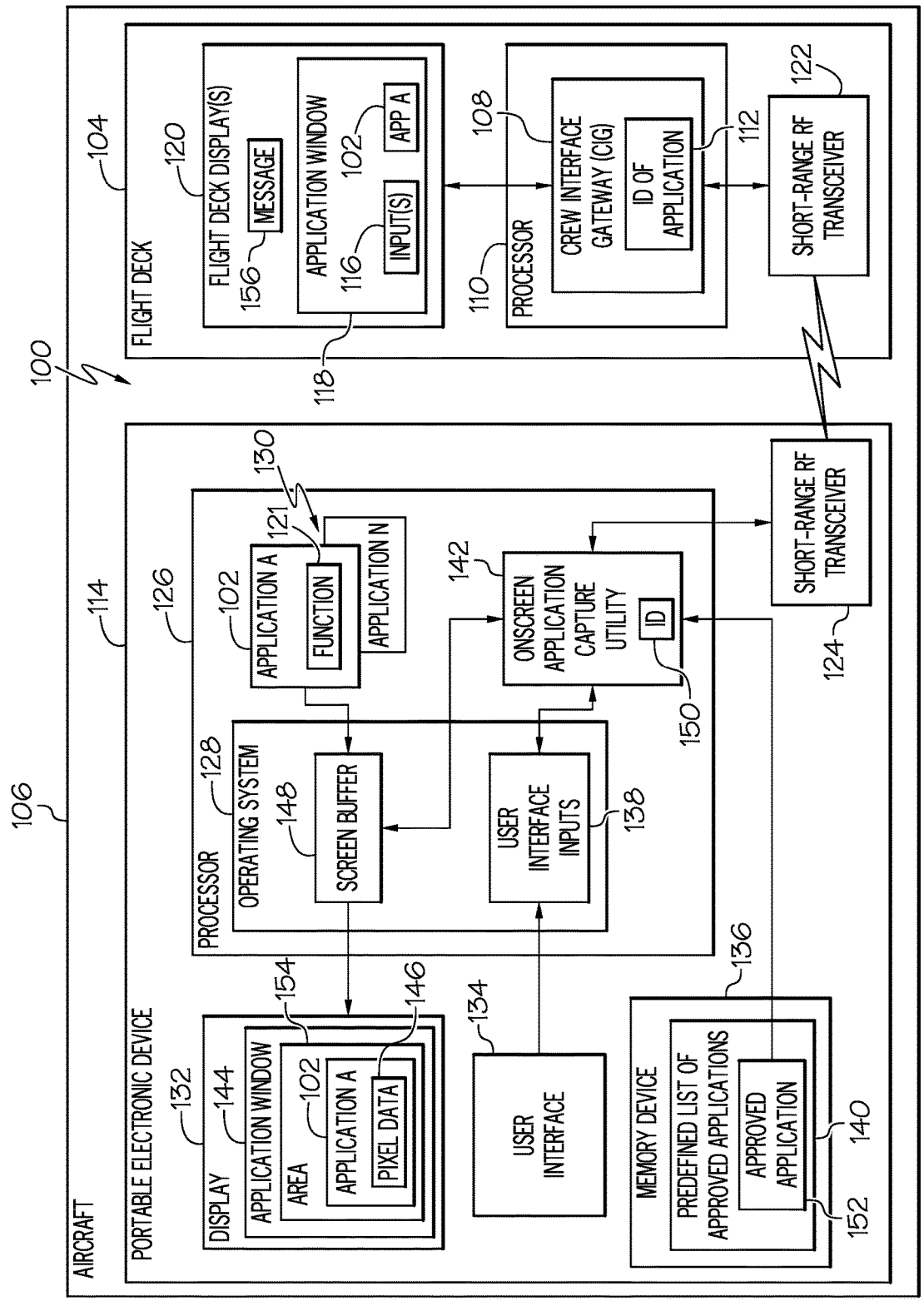
FIG. 1 is a block schematic diagram of an example of a system for integrating an application into a flight deck of an aircraft in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is a block schematic diagram of an example of a system 100 for integrating an application 102 (e.g. 102a, 102b) into a flight deck 104 of an aircraft 106 in accordance with an embodiment of the present disclosure. The system 100 includes the flight deck 104. The flight deck 104 or system 100 includes a crew interface gateway (CIG) 108. In accordance with an example, the crew interface gateway 108 is embodied in and operates on a processor 110 in the flight deck 104. The crew interface gateway 108 is configured to receive an identification (ID) 112 of the application 102 for integrating into the flight deck 104 that is entered by a user or flight crew member. As used herein integrating into the flight deck 104 also includes presenting and running the application 102 on a flight deck display 120 and controlling operation of the application via the flight deck 104 and/or the flight deck display 120 as described herein. Presenting and running the application 102 on a flight deck display also includes presenting and running the application on a plurality of flight deck displays that are in a cockpit or flight deck of an aircraft.

The application 102 is running on a portable electronic device (PED) 114 (e.g. smartphone, tablet computer, etc.) separate from the flight deck 104.

The crew interface gateway 108 is also configured to receive an input or inputs 116 entered by a user or flight crew member into an application window 118 running on the flight deck display 120 and to transmit the inputs 116 to the PED 114 for performance of a function 121 by the application 102 on the PED 114 in response to the inputs 116. In the example of FIG. 1, the flight deck display 120 or displays include touch screens. In accordance with another example, the inputs 116 are entered by the user or flight crew member using any type of user interface (not shown in FIG. 1), such as for example, a keyboard, keypad, voice recognition or other mechanism. The identification 112 of the application 102 is received by the application window 118 on the flight deck display 120 or entered by the user via another type user interface and transmitted to the crew interface gateway 108.

The crew interface gateway 108 is further configured to transmit the identification 112 of the application 102 to the PED 114. The flight deck 104 includes a short-range radio frequency (RF) transceiver 122 operatively coupled to the crew interface gateway 108 or processor 110 for transmitting the identification 112 of the application 102 for integrating into the flight deck 104 to the PED 114. In accordance with an example, the short-range RF transceiver 122 includes a Bluetooth transceiver, WIFI transceiver or similar RF communications device.

The PED 114 also includes a short-range RF transceiver 124 configured to receive the identification 112 of the application 102 for integrating into the flight deck 104 and to receive other inputs 116 from the short-range RF transceiver 122 of the flight deck 104. In accordance with an example, the short-range RF transceiver 124 includes a Bluetooth transceiver, WIFI transceiver or similar RF communications device.

The PED 114 includes a processor 126 and an operating system 128 operable on the processor 126. The processor 126 or operating system 128 is configured to compile and run applications 130 including the application 102 for integrating into the flight deck 104 and for running on the flight deck display 120 or displays.

The PED 114 also includes a display 132 for presenting the application 102 and information associated with the application when running on the PED 114 or processor 126 by the operating system 128.

The PED 114 additionally includes a user interface 134 and a memory device 136. Examples of the user interface 134 include but are not necessarily limited to a keypad, computer pointing device, touchscreen, etc. for controlling operation of the PED 114. User interface inputs 138 entered by a user via the user interface 134 are received by the processor 126 or operating system 128 for performing functions by the PED 114 and for controlling operation of the PED 114. The system 100 also includes a predefined list of approved applications 140 that are pre-approved for integrating into the flight deck 104 and for running on the flight deck display 120 or displays. The predefined list of approved applications 140 are stored in the memory device 136.

The system 100 also includes an onscreen application capture utility 142 operable on the PED 114 or processor 126 of the PED 114. The onscreen application capture utility 142 receives the identification 112 of the application 102 for integrating into the flight deck 104 from the flight deck 104 or crew interface gateway 108 via the short-range RF transceiver 122. In accordance with an embodiment, the onscreen application capture utility 142 is configured to match the identification 112 of the application 102 for integrating into the flight deck 104 to an identification (ID) 150 of an approved application 152 in the predefined list of approved applications 140 for integrating into the flight deck 104. The onscreen application capture utility 142 is also configured to locate an application window 144 corresponding to the application 102 on the display 132 of the PED 114 in response to matching the identification 112 of the application 102 for integrating into the flight deck 104 to the identification 150 of the approved application 152 in the predefined list of approved applications 140.

The onscreen application capture utility 142 is also configured to read pixel data 146 corresponding to the application window 144 including the application 102 on the display 132 of the PED 114, and to transmit the pixel data 146 from the PED 114 to the flight deck 104 using the short-range RF transceivers 122 and 124. The pixel data 146 is received by a screen buffer 148 running on the operating system 128 of the processor 126 and transmitted to the onscreen application capture utility 142. The short-range RF transceiver 124 receives the pixel data 146 from the onscreen application capture utility 142 which transmits the pixel data 146 to the short-range RF transceiver 122 of the flight deck 104. The crew interface gateway 108 receives the pixel data 146 from the short-range RF transceiver 122. The crew interface gateway 108 is further configured to integrate the application 102 into the flight deck 104 using the pixel data 146. The application 102 is then presented in the flight deck display 120 or displays and runs in the application window 118 of the flight deck display 120 or displays.

The onscreen application capture utility 142 is further configured to locate the application window 144 corresponding to the application 102 on the display 132 of the PED 114 by matching the identification 112 of the application 102 to the identification 150 specified in the onscreen application capture utility 142. The onscreen application capture utility 142 is further configured to read the pixel data 146 limited to an area 154 on the display 132 of the PED 114 occupied by the application window 144.

Figure 2A:
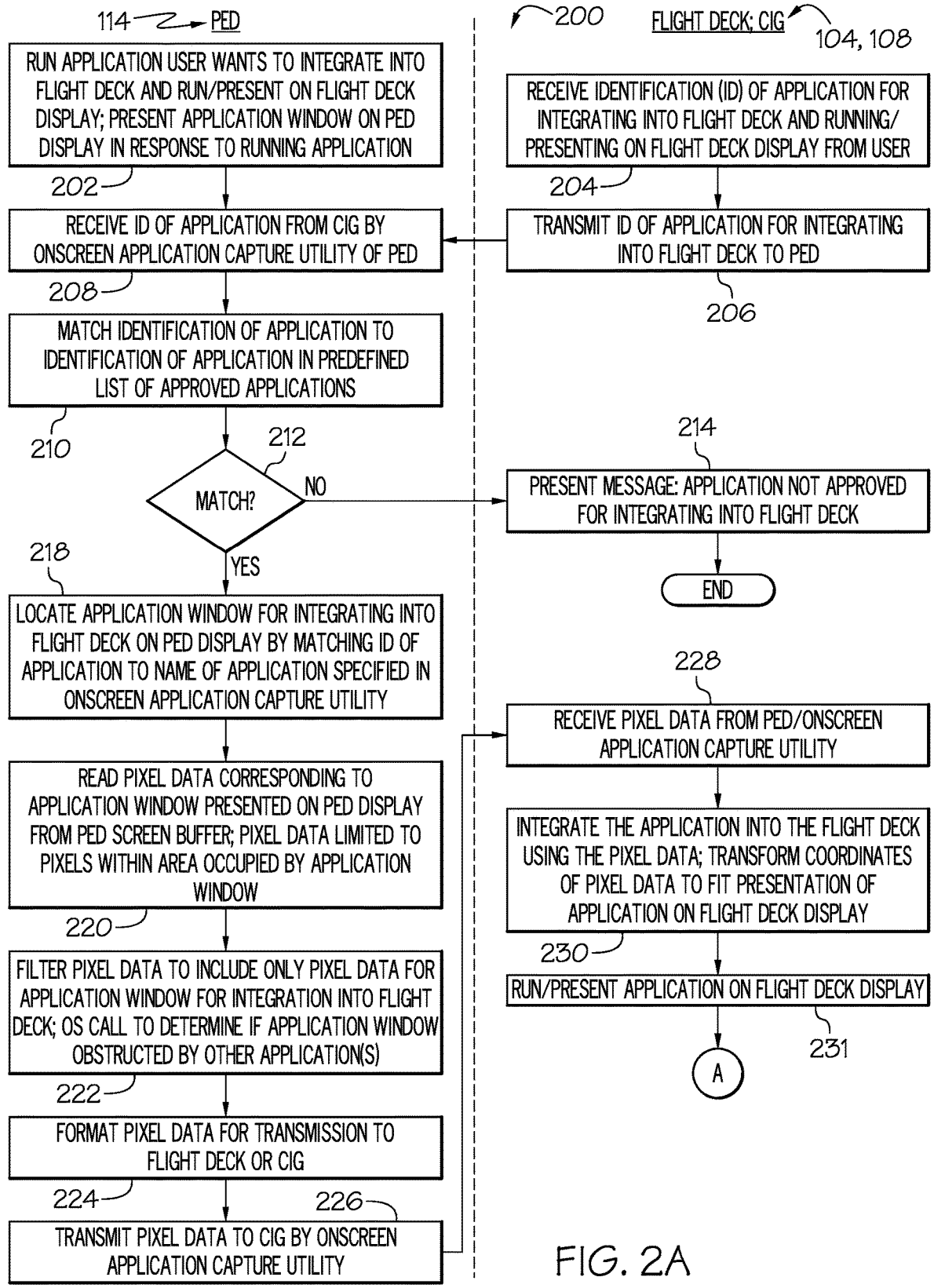
FIGS. 2A and 2B are a flow chart of an example of a method for integrating an application running on the PED into the flight deck in accordance with an embodiment of the present disclosure.
Figure 2B:
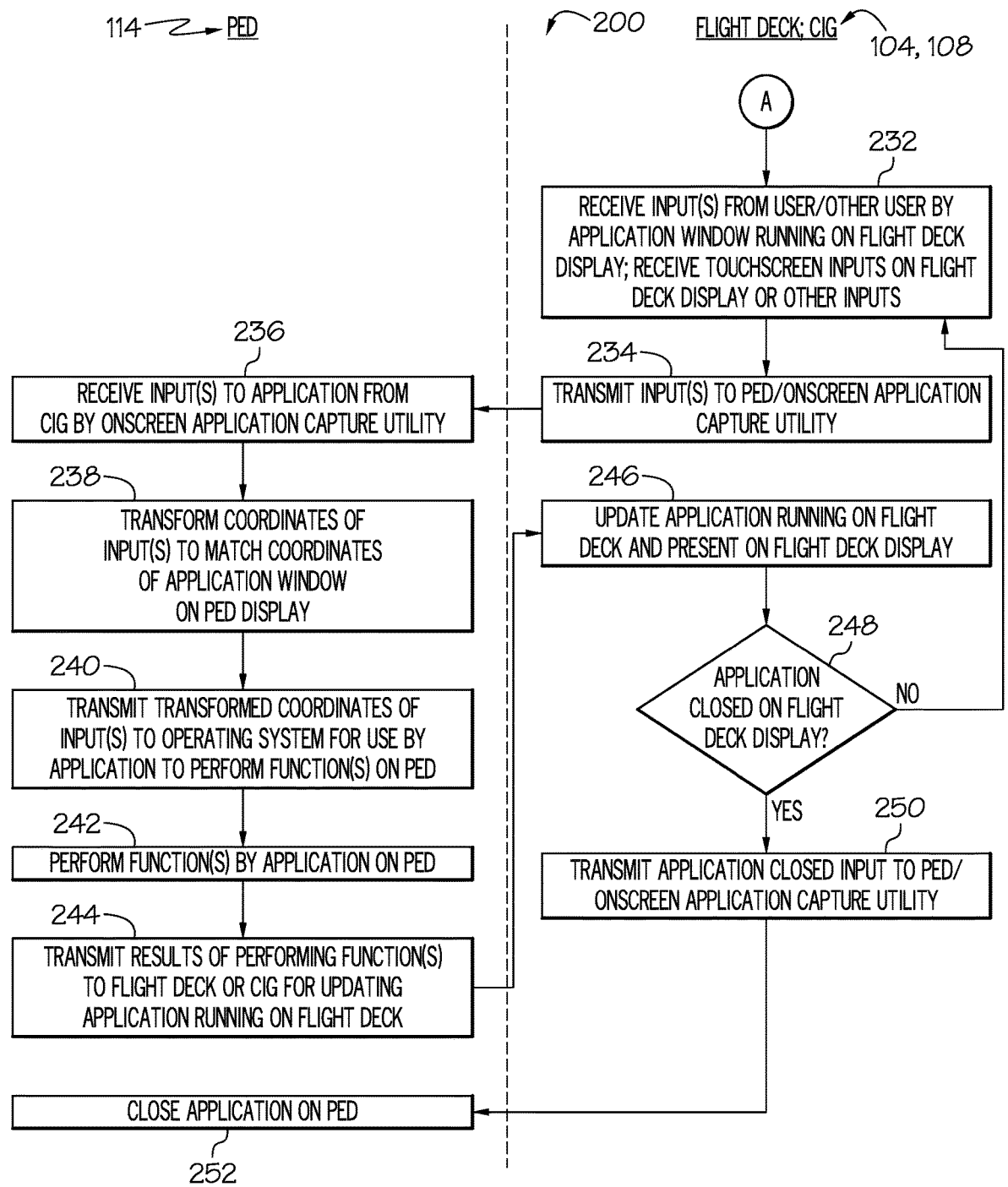

FIGS. 2A and 2B are a flow chart of an example of a method 200 for integrating an application running on a PED into a flight deck in accordance with an embodiment of the present disclosure. In accordance with an example, the method 200 is embodied in and performed by the system 100 in FIG. 1 which includes the flight deck 104 and the PED 114. As shown in FIGS. 2A and 2B some operations or steps of the method 200 are performed by the PED 114 and other operations or steps of the method 200 are performed by the flight deck 104 or crew interface gateway (CIG) 108.

In block 202, an application the user wants to integrate into the flight deck and run and/or present on the flight deck display is activated and run on the PED. An application window, such as application window 144 in FIG. 1, is opened and presented on a display of the PED in response to activating and running the application on the device.

In block 204, an identification of the application for integrating into the flight deck and for running and/or presenting the application on a flight deck is received from a user. The application is running on the PED separate from the flight deck. In accordance with an example, the identification of the application is received by receiving touchscreen inputs by a user on the flight deck display.

In block 206, the identification of the application is transmitted by the flight deck to the PED. Similar to that previously described, the identification of the application is transmitted by a crew interface gateway via a short-range RF transceiver.

In block 208, the identification of the application for integration into the flight deck is received by the PED from the flight deck or crew interface gateway. The identification of the application is received by another short-range RF transceiver of the PED. An onscreen application capture utility operating on the PED or processor of the PED receives the identification of the application for integrating into the flight deck from the short-range RF transceiver of the PED.

In block 210, the identification of the application for integrating into the flight deck is matched to an identification of an approved application in a predefined list of approved applications for integrating into the flight deck. In block 212, a determination is made if a match is found. If a match is not found, the method 200 advances to block 214. In block 214, a message 156 (FIG. 1) is presented on the flight deck display that the application is not approved for integrating into the flight deck in response to not being able to match the identification of the application to the identification of one of the approved applications in the predefined list of approved applications after which the method 200 will then end.

If a match is found in block 212, the method 200 advances to block 218. In block 218, an application window that corresponds to the application for integrating into the flight deck is located on a display of the PED 114. Locating the application window corresponding to the application on the display of the PED includes matching the identification of the application to an identification specified in an onscreen application capture utility.

In block 220, pixel data corresponding to the application window on the display of the PED is read. In accordance with an example, reading the pixel data corresponding to the application window on the display of the PED includes reading red, green and blue pixel values from a screen buffer of the PED. Reading the pixel data also includes limiting the pixel data to pixel data in an area on the display of the PED occupied by the application window.

In block 222, the pixel data is filtered to include only pixel data in the application window for integrating into the flight deck. An operating system call is performed to determine if the application window is obstructed by a window of any other application or applications.

In block 224, the pixel data is formatted for transmitting to the flight deck or the crew interface gateway (CIG) of the flight deck. In accordance with an example, the pixel data is compressed using JPEG, portable network graphics (PNG), H.264 video coding or similar technology.

In block 226, the pixel data is transmitted from the PED to the flight deck. In block 228, the pixel data is received by the flight deck or crew interface gateway in the flight deck from the PED or onscreen application capture utility.

Figure 3:
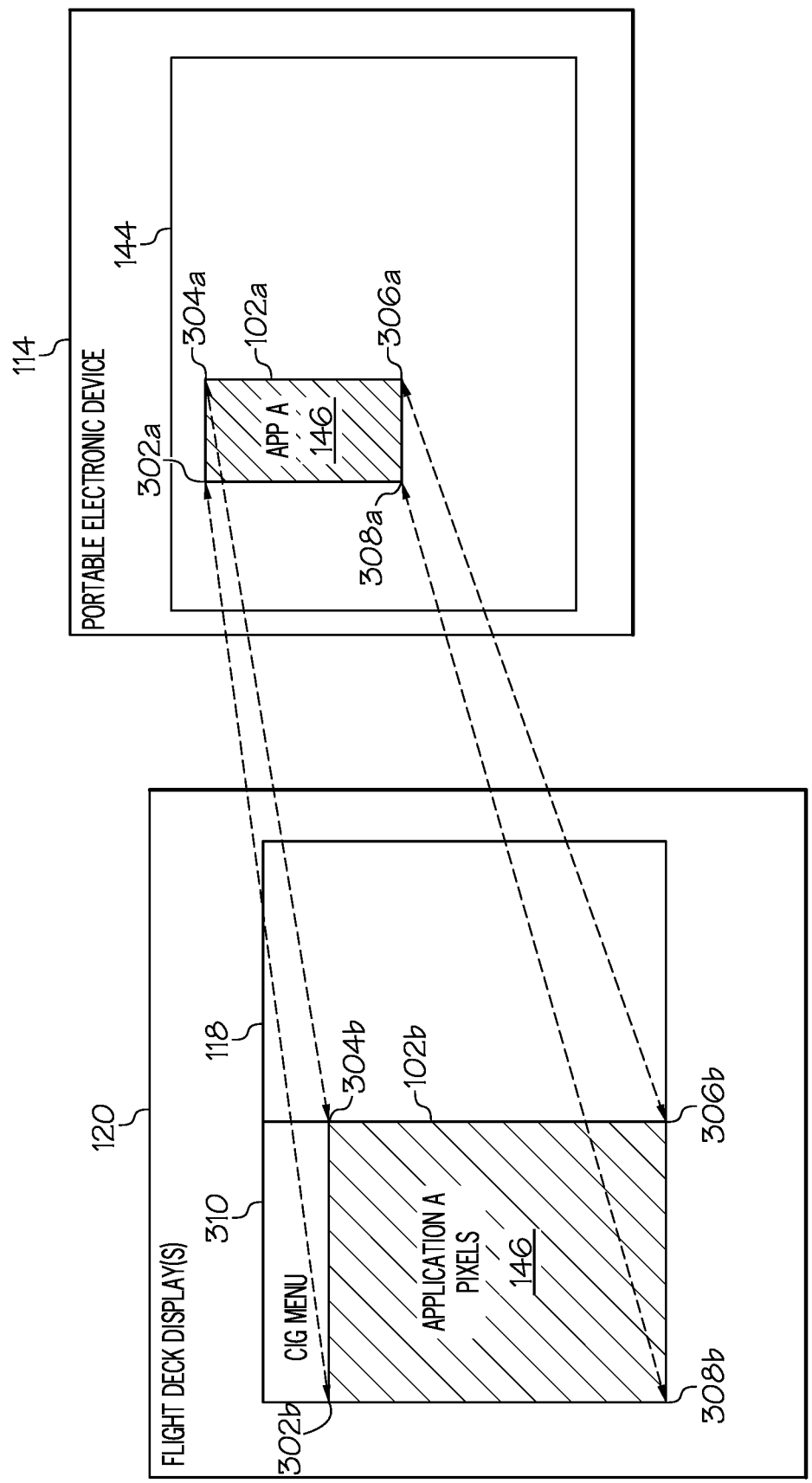
FIG. 3 is an illustration of transforming coordinates of pixel data to fit presentation of the application on a flight deck display in accordance with an embodiment of the present disclosure.

In block 230, the application is integrated into the flight deck using the pixel data. By integrating the application into the flight deck, the application is run and presented on the flight deck display. Also in block 230, coordinates of the pixel data are transformed to fit presentation of the application or application window on a flight deck display. Referring also to FIG. 3, FIG. 3 is an illustration of transforming coordinates of pixel data 146 to fit presentation of the application 102b on a flight deck display 120 in accordance with an embodiment of the present disclosure. The coordinates of the corners 302a, 304a, 306a and 308a of the application 102a on the PED 114 are transformed, translated or mapped to correspond with the coordinates of the corners 302b, 304b, 306b and 308b of the application 102b on the flight deck display 120. The transformation or mapping preserves the aspect ratio to avoid distortion of the content or text presented in the application. The transformation or mapping scales the application window on the PED up or down to fit within the flight deck display area to fill as much width or height as possible in the flight deck display, and translate the application window to be against one of the edges of the flight deck display area, for example, at a bottom left corner, similar to that illustrated in FIG. 3. In accordance with an example, the application window 118 also contains a crew interface gateway (CIG) menu 310. In the example illustrated in FIG. 3, the CIG menu 310 is presented above the application 102b.

Figure 4:
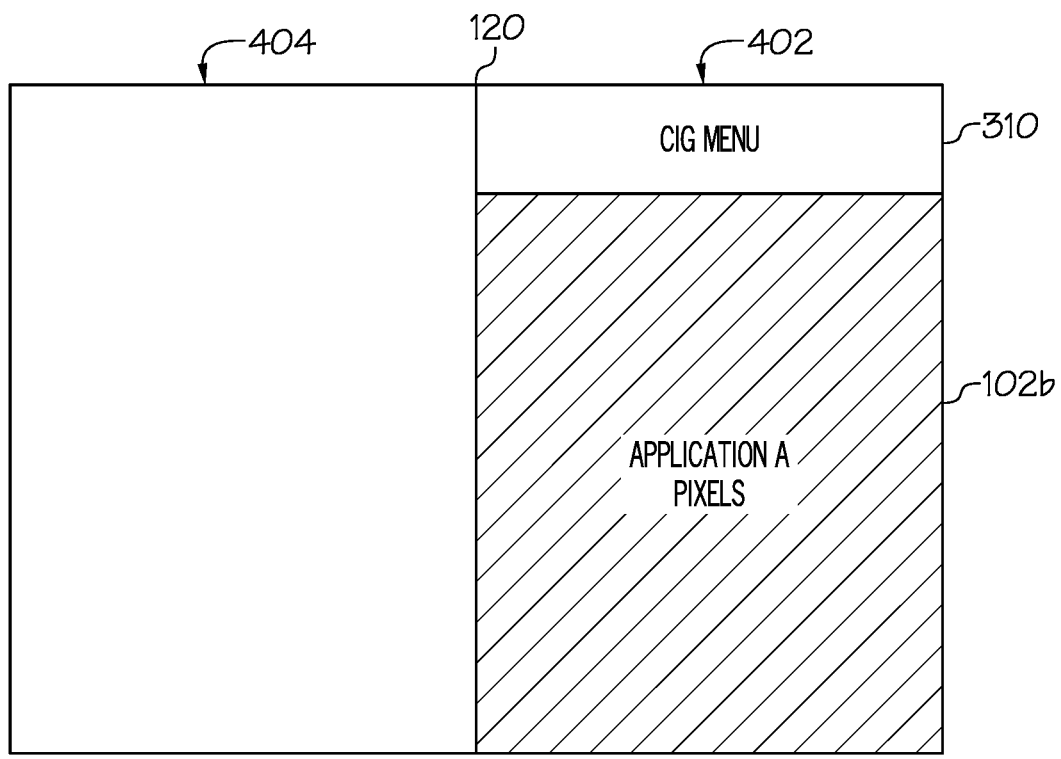
FIG. 4 is an illustration of presenting the application on a right portion or side of the flight deck display in accordance with an embodiment of the present disclosure.
Figure 5:
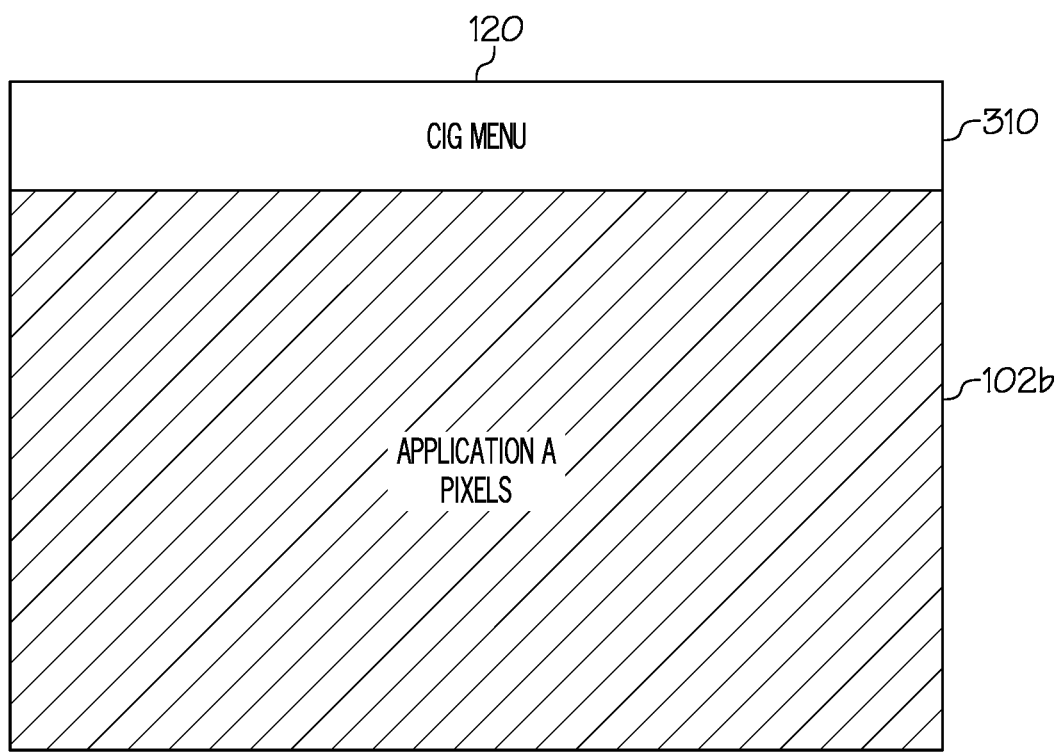
FIG. 5 is an illustration of presenting the application on the full screen of the flight deck display in accordance with an embodiment of the present disclosure.

In block 231, the application is run on the flight deck display. By integrating the application into the flight deck, the application is run and presented on the flight deck display. Referring also to FIGS. 4 and 5, FIG. 4 is an illustration of presenting the application 102b on a right portion 402 or side of the flight deck display 120 in accordance with a further embodiment of the present disclosure. FIG. 5 is an illustration of presenting the application 102b on the full screen of the flight deck display 120 in accordance with a further embodiment of the present disclosure. The user may selectively present the application 102b on the full screen of the flight deck display 120, right portion 402 or left portion 404 of the flight deck display 120. A CIG menu 310 is also presented in association with the application 102b.

In accordance with an example, in block 232 the method 200 also includes receiving an input or inputs from a user by the application window running on the flight deck display. In accordance with a further example, receiving the input or inputs from the user by the application window includes receiving touchscreen inputs by the flight deck display. In another example, the input or inputs are entered by the user via a user interface, such as a keypad, computer pointing device, voice recognition or other mechanism for entering inputs.

In block 234, the input or inputs are transmitted to the PED 114 by the crew interface gateway of the flight deck. As previously described, the input or inputs are transmitted by the crew interface gateway using a short-range RF transceiver 122 (FIG. 1).

In block 236, the input or inputs to the application are received from the flight deck 104 or crew interface gateway 108 by an onscreen application capture utility of the PED 114. In block 238, coordinates of the input or inputs are transformed from the flight deck 104 to match coordinates of the application window on the display of the PED 114. As previously described, FIG. 3 is an illustration of transforming coordinates of pixel data to fit presentation of the application on the flight deck display and similarly to transform coordinates of inputs from the flight deck display to match coordinates of the application window on the display of the PED 114.

In block 240, the transformed coordinates of the input or inputs from the flight deck 104 or crew interface gateway 108 of the flight deck 104 are transmitted to the operating system of the PED 114 for use by the application to perform a function or functions by the application running on the PED 114 using the coordinates. An example of a function includes operating a button or other feature on the PED 114.

In block 242, the function or functions are performed by the application on the PED. In block 244, the results of performing the function or functions by the application on the PED are transmitted back to the flight deck 104 or crew interface gateway 108 of the flight deck 104.

In block 246, the application running on the flight deck 104 is updated and presented on the flight deck display 120.

In block 248, a determination is made whether the application has been closed on the flight deck display. If the application has not been closed, the method 200 returns to block 232 and the application window running on the flight deck display may receive additional inputs and the method 200 will continue as previously described. If the application has been closed, the method 200 advances to block 250.

In block 250, an application closed input is transmitted to the PED 114. The application closed input is received by the onscreen application capture utility running on the PED 114. In block 252, the onscreen application capture utility is configured to close the application on the PED 114.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for integrating an application into a flight deck, comprising:
    receiving, by the flight deck, an identification of the application for integrating into the flight deck, wherein the application is running on a portable electronic device (PED) separate from the flight deck and wherein the identification of the application is received from a user;
    transmitting, by the flight deck, the identification of the application to the PED;
    locating an application window corresponding to the application on a display of the PED;
    reading pixel data corresponding to the application window on the display of the PED;
    receiving, by the flight deck, the pixel data from the PED; and
    integrating the application into the flight deck using the pixel data, wherein integrating the application into the flight deck comprises presenting and running the application on a flight deck display.

2. The method of claim 1, further comprising presenting the application window on the display of the PED in response to running the application on the PED.

3. The method of claim 1, wherein receiving the identification of the application comprises receiving touchscreen inputs by the user on the flight deck display.

4. The method of claim 1, wherein locating the application window corresponding to the application on the display of the PED comprises matching the identification of the application to an identification specified in an onscreen application capture utility.

5. The method of claim 1, wherein locating the application window corresponding to the application on the display of the PED comprises matching the identification of the application to an identification of an approved application in a predefined list of approved applications for integrating into the flight deck.

6. The method of claim 5, further comprising presenting a message on the flight deck display that the application is not approved for integrating into the flight deck in response to not being able to match the identification of the application to the identification of one of the approved applications in the predefined list of approved applications.

7. The method of claim 1, wherein reading the pixel data corresponding to the application window on the display of the PED comprises reading red, green and blue pixel values from a screen buffer of the PED.

8. The method of claim 7, wherein reading the pixel data comprises limiting the pixel data to pixel data in an area on the display of the PED occupied by the application window.

9. The method of claim 1, further comprising filtering the pixel data to include only pixel data in the application window for integrating into the flight deck.

10. The method of claim 1, further comprising formatting the pixel data for transmitting to the flight deck.

11. The method of claim 1, further comprising receiving the pixel data from the PED by a crew interface gateway in the flight deck.

12. The method of claim 11, further comprising transforming coordinates of the pixel data to fit presentation of the application on the flight deck display.

13. The method of claim 1, further comprising receiving inputs from a user by an application window running on the flight deck display.

14. The method of claim 13, wherein receiving inputs from the user by the application window comprises receiving touchscreen inputs by the flight deck display.

15. The method of claim 13, further comprising:
    transmitting the inputs to the PED by a crew interface gateway of the flight deck;
    transforming coordinates of the inputs from the flight deck to match coordinates of the application window on the display of the PED; and
    performing functions by the application on the PED using the transformed coordinates of the inputs.

16. A system for integrating an application into a flight deck, comprising:
    a flight deck comprising a crew interface gateway, the crew interface gateway being configured to receive an identification of the application for integrating into the flight deck from a user, wherein the application is running on a portable electronic device (PED) separate from the flight deck, and the crew interface gateway is further configured to transmit the identification of the application to the PED;
    an onscreen application capture utility operable on the PED, the onscreen application capture utility being configured to locate an application window corresponding to the application on a display of the PED, to read pixel data corresponding to the application window on the display of the PED, and to transmit the pixel data from the PED to the flight deck; and
    wherein the crew interface gateway is further configured to integrate the application into the flight deck using the pixel data and wherein the application is integrated into the flight deck by presenting and running the application on a flight deck display.

17. The system of claim 16, wherein the onscreen application capture utility is further configured to locate the application window corresponding to the application on the display of the PED by matching the identification of the application to an identification specified in the onscreen application capture utility.

18. The system of claim 16, further comprising a predefined list of approved applications, wherein the onscreen application capture utility is further configured to match the identification of the application for integrating into the flight deck to an identification of an approved application in the predefined list of approved applications for integrating into the flight deck.

19. The system of claim 16, wherein the onscreen application capture utility is further configured to read the pixel data limited to an area on the display of the PED occupied by the application window.

20. The system of claim 16, wherein the crew interface gateway is further configured to receive inputs entered by the user into an application window running on the flight deck display and to transmit the inputs to the PED for performance of a function by the application on the PED in response to the inputs.

* * * * *